United States Patent [19]
Liu et al.

[11] Patent Number: 5,519,860
[45] Date of Patent: May 21, 1996

[54] CENTRAL PROCESSOR INDEX SORT FOLLOWED BY DIRECT RECORD SORT AND WRITE BY AN INTELLIGENT CONTROL UNIT

[75] Inventors: Peter Chi-Hsiung Liu, Paramus, N.J.; Steven G. DeGrange, Fishkill, N.Y.; Thomas I. Chow, South Orange, N.J.

[73] Assignee: Syncsort Incorporated, Woodcliff Lake, N.J.

[21] Appl. No.: 335,182

[22] Filed: Nov. 7, 1994

Related U.S. Application Data

[63] Continuation of Ser. No. 829,747, Jan. 31, 1992, abandoned.
[51] Int. Cl.$^6$ ................................................. G06F 17/30
[52] U.S. Cl. ................. 395/600; 395/800; 364/222.9; 364/283.1; 364/962.3; 364/DIG. 1; 364/DIG. 2
[58] Field of Search .................................. 395/600, 800, 395/425, 275, 700; 364/419.19

[56] References Cited

U.S. PATENT DOCUMENTS

| | | | |
|---|---|---|---|
| 3,713,107 | 1/1973 | Barsamian | 395/800 |
| 3,947,825 | 3/1976 | Cassada | 395/800 |
| 4,110,837 | 8/1978 | Chen | 395/800 |
| 4,425,617 | 1/1984 | Sherwood | 395/425 |
| 4,611,280 | 9/1986 | Linderman | 395/800 |
| 4,628,483 | 12/1986 | Nelson | 395/800 |
| 4,736,341 | 4/1988 | Redmond et al. | 395/500 |
| 4,811,199 | 3/1989 | Kuechler et al. | 345/600 |
| 4,823,257 | 4/1989 | Tonomura | 395/700 |
| 5,050,075 | 9/1991 | Herman et al. | 395/600 |
| 5,091,852 | 2/1992 | Tsuchida et al. | 395/600 |
| 5,117,495 | 5/1992 | Liu | 395/600 |
| 5,247,662 | 9/1993 | Minemura et al. | 395/600 |
| 5,247,665 | 9/1993 | Matsuda et al. | 395/600 |
| 5,265,065 | 11/1993 | Turtle | 395/600 |
| 5,386,578 | 1/1995 | Lin | 395/800 |
| 5,418,948 | 5/1995 | Turtle | 395/600 |

OTHER PUBLICATIONS

Korth and Silberschatz, *Database System Concepts*, McGraw–Hill Book Company (New York, 1986), pp. 265–274.

Robert Moran, "IBM Molds a Storage Strategy: IBM's 3990 Storage Controls", *Computer & Communications Decisions*, vol. 20, No. 1, Jan., 1988, pp. 74–75.

Anonymous, "IBM Unleashes Hiperspace Capability with DFSort, CICS Aid . . ."*Computergram International*, Issue n1111. pELECTRNC JOURNAL.

Ryan Davis–Wright, "Hard–Disk Controller Clears Bottlenecks: Cache–RAM Controller Board Saves Time, Boosts Productivity", *PC Week*, vol. 6, No. 11, Mar. 20, 1989. pp. 77–78.

Catherine D. Miller, "Get Smart: High Performance Caching Disk Controllers.", *PC Magazine*, vol. 9, No. 1, Jan. 16, 1990.

*Primary Examiner*—Thomas G. Black
*Assistant Examiner*—Paul R. Lintz

[57] ABSTRACT

A sort process for use on input records which reside on intelligent peripherals. The main computer accesses key values from specified fields in the input records skeletons and performs the sort on those key values or skeletons. A further aspect of the invention is a write operation whereby the sorted order of the records and their original locations are returned to the peripheral, which will create the output file of sorted records without further involvement of the main computer.

13 Claims, 4 Drawing Sheets

FIG. 2

| Case | Input | Work | Output | Eligible for Skeleton Sort |
|------|-------|------|--------|----------------------------|
| 1 |   |   |   | No |
| 2 |   |   | X | No |
| 3 |   | X |   | No |
| 4 |   | X | X | No |
| 5 | X |   |   | Yes, Use Method A |
| 6 | X |   | X | Yes, Use Method B |
| 7 | X | X |   | Yes, Use Method A |
| 8 | X | X | X | Yes, Use Method B |

X means this data is in skeleton domain

Method A: Use skeleton-read on input in step 2 & use normal read/write in step 4.
Method B: Use skeleton-read on input in step 2 & skeleton write in step 4.

CENTRAL PROCESSOR INDEX SORT FOLLOWED BY DIRECT RECORD SORT AND WRITE BY AN INTELLIGENT CONTROL UNIT

This is a continuation of application(s) Ser. No. 07/829,747 filed on Jan. 31, 1992 now abandoned.

This invention relates to a method of sorting data, and more particularly, a method for using the processing capabilities of intelligent secondary storage to enhance the sorting process.

BACKGROUND OF THE INVENTION

The operation of sorting computer data records is a function which requires a substantial amount of the computer's resources. The sorting process, known in the art, generally involves reading into memory all of the records from an input file on an external storage medium, sorting the records in a desired order, and writing the sorted records to an output file. The specific distinct steps utilized are generally referred to as initialization, reading and sorting, merging and writing.

The first step, of initialization, involves parsing user-supplied sorting information and planning a sort strategy and resource allocation. Typically, users supply the names of the input files to be sorted, the name of the resulting output file, and the fields in the input data which are to be used as the basis for the sort, i.e. the key. Next, the initialization routine will determine what resources are available, specifically the amount of memory and of temporary storage space available for use. Based on the resources and the input/output files, the initialization routine will then determine an input/output (I/O) strategy and sort strategy for use on the data. The I/O strategy is based on providing the input file to memory as fast as possible with the least amount of computational work and attendant delay. The sort strategy is based on effectively sorting the data with the given amount of memory and auxiliary storage.

The second step involves reading the data from storage into the computer's memory and sorting the data. Standard input or read commands access the data from the input files located on external storage. A number of different sort algorithms can be implemented depending upon the nature of the data and the resources. Quicksoft, external, heap, radix, tag and bubble sorts are commonly used sort algorithms.

The third step, the merge step, only comes into play if the amount of data to be sorted is larger than the memory can hold. If the number of records exceeds the available memory space, the sort may be conducted in a series of steps whereby less than all of the records are read into the computer's memory at a time. Those records are sorted and stored as a string, or run. After all records have been sorted into strings, the strings are merged into larger strings until all of the data is in the correct order.

The fourth step consists of writing the final sorted data to the designated output file. Standard write commands will be used unless, as in the tag sort instance, the records themselves must be read from the external storage device prior to writing to an output file.

A final cleanup will also be implemented as described in detail below.

Given the resources needed to effect a sort, the prior art is replete with teachings for enhancing the sort process. Improvements to sorting have been directed, in a first instance, to the actual sorting algorithm, such as is found in U.S. Pat. No. 4,809,158 of McCauley, wherein the number of comparisons needed to effect a sort is minimized. A second approach to sorting enhancement is to optimize the input/output (I/O) processing time, given the number of I/O's involved in reading the data into memory, storing strings, reading strings from storage, etc. Examples of I/O improvement strategies can be found in U.S. Pat. No. 4,210,961 of Whirlow, et al, which is specifically drawn to sorting, and U.S. Pat. No. 4,930,065 of McLagan, et al drawn to generic I/O improvement in a computer system. A third approach to optimized sorting is to actually minimize the amount of data to be read, sorted and output. A tag sort or key sort, such as is described in a copending application entitled *Modified External Tagsort*, Ser. No. 07/812,636, filed Dec. 23, 1991 and assigned to the present assignee, sorts tags, or short identifiers, which represent the presumably larger records to be sorted. Minimizing data in this way results in a reduction in the amount of available memory required for sorting, a decrease in the I/O time and, ideally, fewer sorting and merging steps. The drawback to a tagsort process is that the entire record must be read into the computer's memory initially for the assignment of a tag. The tagged record can then be returned to the external storage device, with its tag remaining in the computer to be operated upon in the sort. Therefore, although the tagging method does facilitate the sorting process, the number of I/O's may be the same and the main computer is still involved.

In accordance with the invention, the storage devices themselves are utilized to facilitate the sorting process. Input files to be sorted are being stored on increasingly "intelligent" peripheral storage means. By exploiting the greater intelligence and processing capabilities of the peripherals, I/O can be improved upon and the amount of data to be sorted can be minimized while utilizing existing sorting algorithms.

It is therefore an objective of the present invention to provide an enhanced sorting strategy.

It is a further objective to provide a sorting method which does not require reading the entire file to be sorted into the main computer.

It is yet another objective of the invention to provide a means for sorting records using less than all of data contained in the records in the sort.

It is a further objective of the invention to utilize the capabilities of smart peripherals to facilitate sorting.

Still another objective is to rely upon the intelligent peripherals to reorder and write the complete records without main processor involvement.

SUMMARY OF THE INVENTION

These and other objectives are realized by the invention wherein the sorting work is allocated among the main computer and its intelligent peripherals. The main computer will operate on minimal information (referred to as the skeleton) from the data on the peripherals. The intelligent peripherals then use the sorted skeleton to rearrange the complete data.

The method involves the steps of having the intelligent peripheral provide the main computer with key values and storage locations of the records to be sorted and the main computer sorting the key values. To output the records in the sorted order, the main computer can read the records into its memory in the sorted order and write them into an output file; or, provide the sorted order to the intelligent peripheral which will then write the records directly to an output file in the sorted order.

BRIEF DESCRIPTION OF THE DRAWINGS

The invention will now be described in greater detail with reference to the drawings wherein:

FIG. 1A illustrates the sort process with a standard write process. FIG. 1B uses the inventive sort and skeleton write flow.

FIG. 2 is a chart indicating one aspect of the analysis done by the main computer in determining eligibility of data for the skeleton sort process.

DETAILED DESCRIPTION OF THE PREFERRED EMBODIMENTS

Figure 1A:
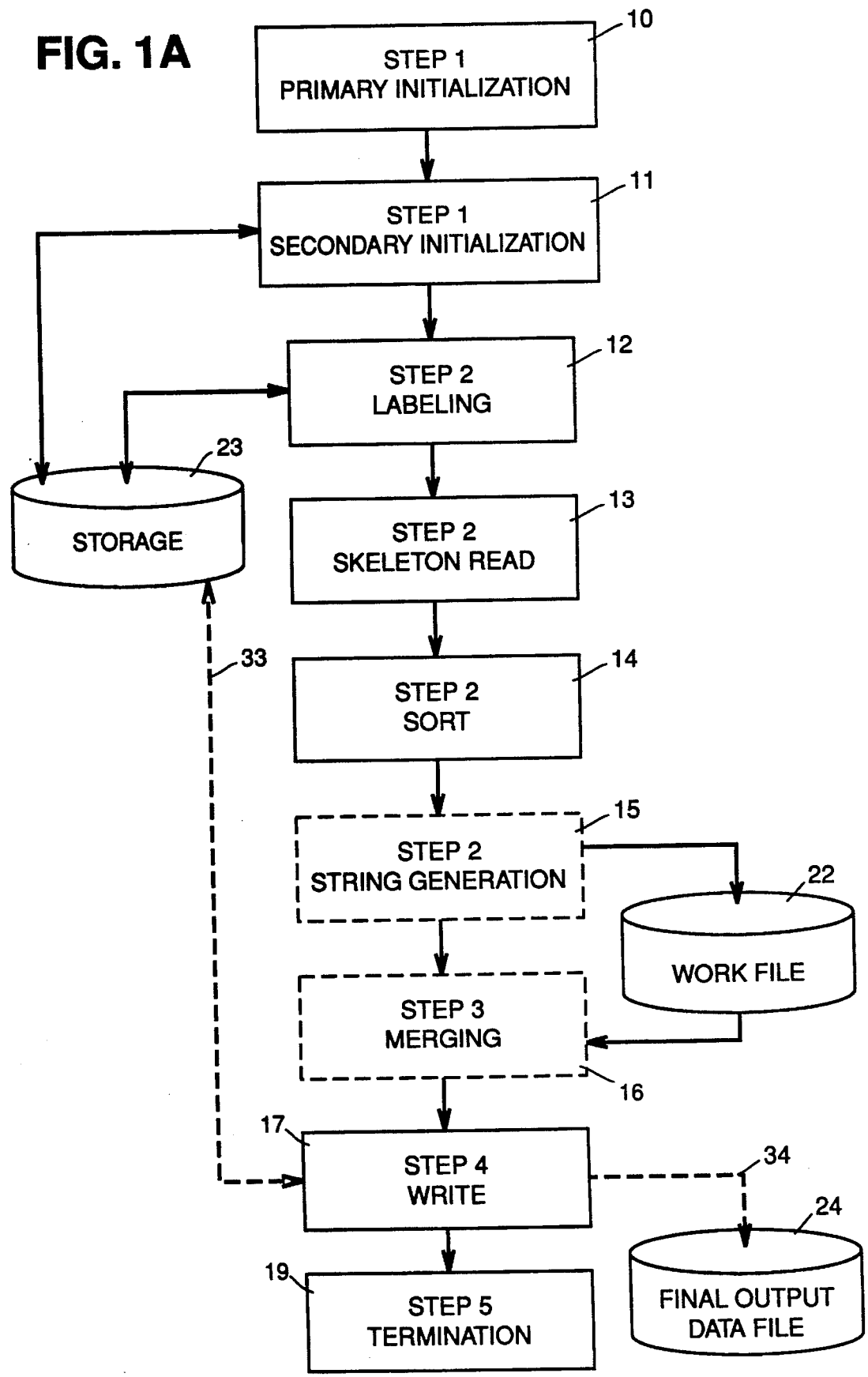
FIGS. 1A and 1B are flow diagrams illustrating the sequence of steps and subprocesses involved in the inventive sort process.

In accordance with the present invention, improvements in the processing capabilities of auxiliary storage will be exploited to reduce the amount of data that needs to be processed, thereby reducing the computation time and minimizing the transfer of data between the computer and the intelligent peripherals. The new process, named skeleton sort, provides enhancement of the sorting process by utilizing the existing capabilities of the peripherals hardware with new I/O commands added to the existing set and enhancement of the read-and-sort step redefining the data to be sorted. A modification to the write process may also be implemented. With regard to hardware modifications, reference is made throughout to skeleton operations as extensions to an IBM 3990 Model 3 Storage Control Unit, channel program operations and facilities. A familiarity with existing 3990-3 facilities, as described in IBM publication GA32-0099-4 is assumed.

Skeleton operations allow the host program to request the control unit to perform additional processing which would otherwise be performed by the host CPU. It does this by defining three new basic groups of CCW operation codes:

1. Token management operations, which create and delete skeleton-tokens. A token, in general, is a control-unit-generated name for something defined to it by the host CPU channel program, and which may be referred to by that name in operations subsequent to its definition. There are two different kinds of tokens used in skeleton operations: structure tokens and access-tokens.

A structure-token represents a file, block, record and field structure specification. Defining a structure-token tells the control unit the format of the data to be operated on and represents that definition by being referred to in subsequent skeleton-write operations.

An access-token represents an authority to access data based on define-extent parameters other than those currently in effect in the current channel program. It allows a single channel program to access data from multiple extents, or devices, within the control of a single control unit.

A password is specified when creating either type of token, and the same password must be specified on all subsequent uses of that token. If the wrong password is specified, a unit check with command reject status is returned.

Specific token management operations include:

Create-Structure-Token (Control)

This operation transfers a password, a record format (F or V), a maximum block size, a maximum record length and a list of field position/length pairs defining the record skeleton structure to the control unit.

The control unit saves this information and assigns a unique token for subsequent reference. This token becomes the current-token and may be transferred to central storage by a chained get-current-token operation for use in subsequent operations.

Create-Access-Token (Control)

This operation transfers a password and a related structure-token to the control unit. In addition to becoming the password for the created access-token, the password must also be valid for the specified structure-token. The control unit saves this information, the current device-id within the control unit, and the current filemask and extent range from the prior define-extent CCW, and assigns a unique token for subsequent reference. This token becomes the current-token and may be transferred to central storage by a chained get-current-token operation for use in subsequent operations.

Get-Current-Token (Read)

This operation transfers the current-token from the control unit to central storage for subsequent use.

If there is no current-token, because no create-structure-token, create-access-token, or skeleton-locate has been executed in this CCW chain, then unit check with command reject status is returned.

Delete-Token (Control)

This operation transfers a password and structure-token from central storage to the control unit. If the token is valid, and password checks do not result in unit check command reject status, then the token and all memory and resources used by it are freed, and the token is made invalid for subsequent use. All access-tokens specifying it as the related structure-token are also deleted and their resources freed. The current-token and current-position become undefined.

2. Skeleton-read operations, which specify the return of specific records and/or skeleton fields, rather than all of the data within a requested block. Skeleton read operations include:

Skeleton-Locate (Control)

This operation transfers to the control unit a password and a structure-token returned from an earlier get-current-token operation and the disk location (CCHHROO—CC:cylinder, HH:head, R:block, and OO:record offset) of the next record whose skeleton is to be read, in preparation for one or more skeleton-read operations. It establishes (or re-establishes) the current-token and current-position.

Skeleton-Read (Read)

This operation transfers the disk location (CCHHROO) and the fields identified by the list of positions and lengths associated with the current-token from the record(s) at the current-position into central storage and updates the current-position for possible use in subsequent skeleton reads.

3. Skeleton-write operations, which specify the copying of blocks or records completely within the control unit, without requiring the data to be transferred from its source location to the host, and then transferred again to its destination location within a device connected to the control unit.

IBM 3990-3 Implementation of Skeleton Sort Operations

All skeleton operations must be chained after a define-extent CCW. This define-extent is used to validate all skeleton data access operations, except for those specifically using an access token. All skeleton-write operations must occur within a format-write type locate-record domain.

Skeleton sort will use the new I/O techniques of skeleton read and skeleton write. The skeleton read command will read the key value of the record and the physical location of the record into the computer's memory, rather than the entire record. The key value with the location, together referred to as the skeleton, will be provided by the intelligent peripherals. Since this information will typically be less extensive than the record itself, less data will need to be transferred to the computer's memory, thereby increasing the number of so-called skeletons which can be sorted by the memory in a single operation. Skeleton write is an analogous function. After the sort, the computer will supply the target location of the record along with the original location of the record to the storage device. The intelligent auxiliary storage will locate the record in its original location and move it to the target location. In execution, the skeleton read and write functions substantially reduce the amount of data transferred between the main computer and the auxiliary storage.

The skeleton sort will use the new read/write command set to read input data that resides on storage facilities capable of supporting those new commands. A control unit data topology in which data is accessible without going through the main computer will be defined as a domain. A skeleton domain is any set of data that can be read, written and moved within the domain, again without all of the data being transferred through the main computer. Typically, a domain corresponds to an I/O subsystem. If a system has the storage facility, or domain, with the capability to support the skeleton read/write commands, it is additionally required that the data to be sorted be accessible through that domain and therefore eligible for skeleton sort treatment.

The table in FIG. 2 illustrates the eligibility of the data for skeleton sort. In general, the work will be eligible for skeleton sort when the input file is in a skeleton domain. It is not necessary that the output file be in the skeleton domain, as a standard write command can be executed instead of the skeleton write command, as will be discussed in detail below. Optimal performance of the inventive sort technique will be achieved when both the input and the output data reside in the same skeleton domain. In that situation, skeleton read commands can be issued for the input data and skeleton write commands can be used for the output data. Cases 6 and 8 of FIG. 2 are examples of the preferred data availability structure.

The sort process will now be detailed in sequential steps with the inventive features specified. Reference is made throughout to the flow diagrams of FIGS. 1 and 3. As above, the distinct steps of the sort process are 1) initialization, 2) reading and sorting, 3) merging, and 4) writing.

The initialization routine is augmented by the inventive process since additional queries are made to determine eligibility of the system for skeleton sort treatment. During the primary initialization step, 10, the computer takes the user supplied information, of input and output file names and key on which the sort is to be conducted, and establishes the input files to be sorted, the output file, and the position and length of the fields of the records' skeleton to be used as sort keys. In the secondary initialization step, 11, the computer queries the system to determine what peripheral storage facility, or domain, holds the input file to be sorted and whether that peripheral, illustrated as 23 in FIG. 1, supports the skeleton read/write commands. The availability of skeleton operations is indicated by a new bit combination returned by the existing Read-Device-Characteristics operation. The domain information and device characteristics will be used by the main computer in determining a sort strategy. In establishing an I/O and a sort strategy, the computer will determine which of the input files will be sorted using the skeleton read/write commands and which must be sorted in the traditional manner.

Figure 3:
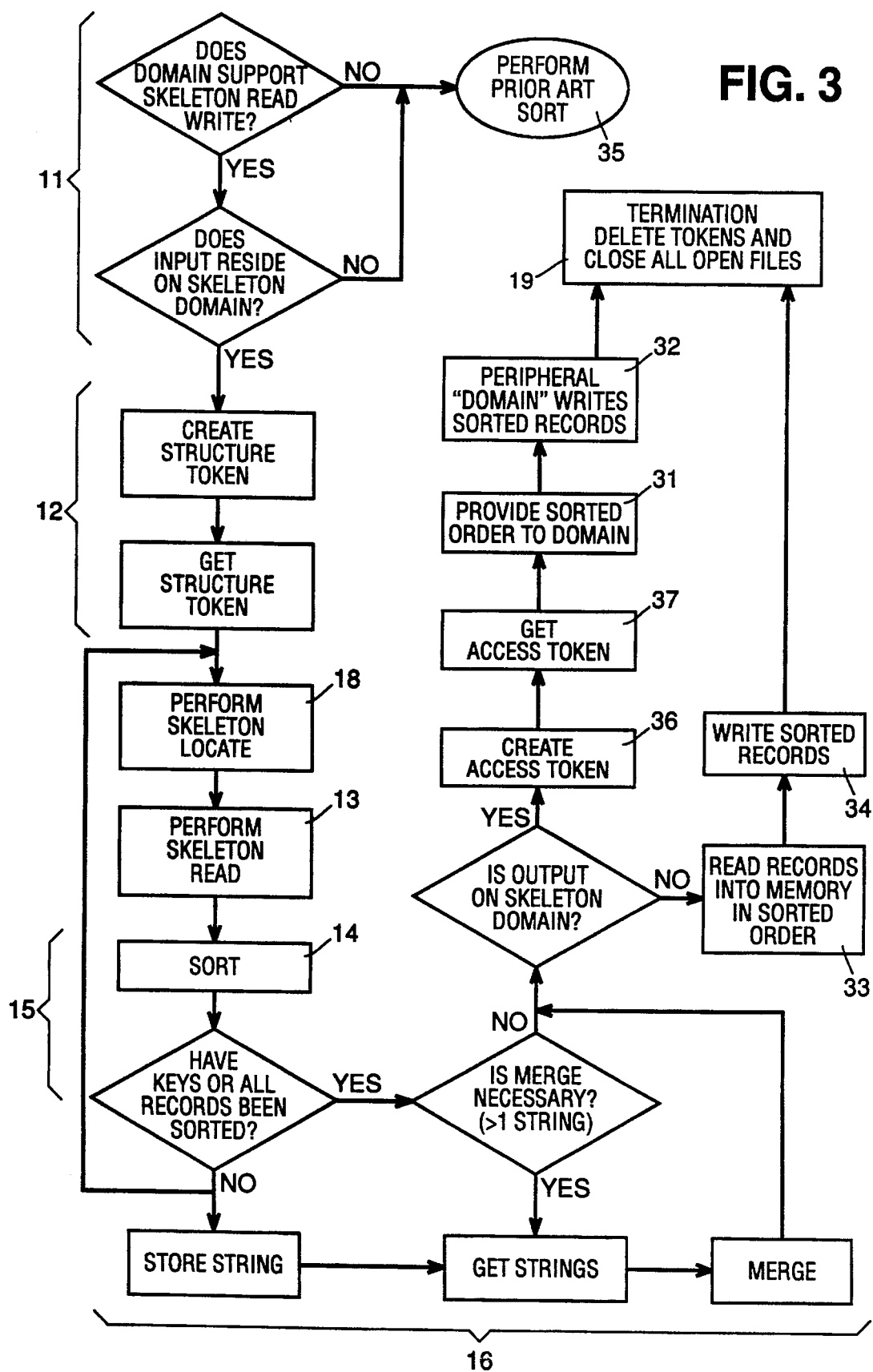
FIG. 3 is a conditions and process flow chart of the main computer functions in skeleton sort processing.

The reading and sorting step will be discussed as applied to those files which are eligible for the skeleton sort. Any files which are not eligible for the skeleton sort would be sorted in accordance with the prior art as noted at 35 of FIG. 3. With regard to those files eligible for skeleton sort, an identifying or labeling step must be conducted prior to reading the data. At 12 in FIGS. 1 and 3, the main computer issues a command to the device control unit, 23, to create a structure token which will contain record format information, block length, record length, and position/length pairs. For an IBM system, one of the new token management operations is invoked. The "Create-Structure-Token" control operation transfers a password, a record format (F or V), a maximum block size (1-32760), a maximum record length (1-32760), and a list of field position/length pairs defining the record skeleton structure to the control unit. A field length of zero indicates the field is from that position to the end of the record. A password to be associated with the record, as noted above, will also be created in order to control access to the record. Obviously, this step involves the communication of substantially more information than just a label; however, the process will be referred to generically as labeling for the sake of ease. The record format (RECFM) specifies how the input data on the storage device is organized, specifically whether it is Fixed(F) or Variable(V). Fixed format means that the input records are of a fixed size. variable format includes a file having records of differing sizes. The record length specifies the maximum size in bytes of the individual records. The block size tells the control unit how many individual records should be grouped together for greatest efficiency. Most importantly, the position/length, P/L, pairs denote the position in the record of the key value, on which the records are to be sorted, and the length of the key from that position. A series of P/L pairs are generally requested of the device control unit since sorting on different information within a record is frequently required. For example, a sort operation might be conducted on a listing of individuals, which would require sorting by last name, first name and zip code. In such a case, three P/L pairs will be required to indicate the location of the names and the zip code within the record. After the main computer has issued the create-structure-token command, it will issue a get-token read command. This command tells the control unit to provide the structure token to the main computer. The token encapsulates the agreement between the main computer and the control unit about the specific data in storage and how it will be handled. With the structure token defined, the main computer will proceed with the reading stage of the step, 13. A skeleton-locate control command, 18 on FIG. 3, issued by the main computer, accesses the exact location on the device which contains the skeleton data to be input, specifically the key value and the record's address. The skeleton-locate command is necessarily accompanied by the password, and includes the structure token and the device location to be read.

In the IBM 3990 system, this operation transfers to he control unit a password and a structure-token returned from an earlier get-current-token operation and the disk location (CCHHROO—CC:cylinder, HH:head, R:block and OO:record offset) of the next record whose skeleton is to be read, in preparation for one or more skeleton-read operations, as noted above. It establishes (or re-establishes) the current-token and current-position. Until the first skeleton-locate in a command chain, the current-position is undefined. If either the token or password provided are invalid, a unit check with command reject is indicated. If the CCHH is outside the current extent, a unit check with file protect is indicated. If the specified block is an end-of-data block (DL=0), the current-position becomes end-file. If the specified record does not exist, unit check with command reject is indicated. A unit check condition causes the current-position to become undefined. Immediately after the skeleton-locate, the main computer issues the skeleton-read command, 13, to read the key values, specified by the P/L pairs, and the address of the record into the computer's memory. In operation, this read command transfers the disk location (CCHHROO) and the fields identified by the list of positions and lengths associated with the current-token from the record(s) at the current-position into central storage and updates the current-position for possible use in subsequent skeleton-reads. If the current position is undefined at the start of the operation, then no data is transferred, the current-position remains undefined, and unit check with command reject status is returned. If the current-position is end-extent at the start of the operation, then no data is transferred, the current-position becomes undefined, and unit check with file protect status is returned. If the current-position is end-file at the start of the operation, then no data is transferred, the current-position becomes undefined, and unit exception is returned. Otherwise, the data at the current position is transferred to central storage under control of the position/length pairs. For record format V data, the first two bytes of the record are interpreted as the record length and are validated to be greater than or equal to four and less than or equal to the maximum record length associated with the current-token. Then length of fields specifying a zero field length is computed as the record-length minus specified-position plus one. If the computed field length is not positive, then that field specification is ignored for the current record. After any data transfer is complete, the current-position is updated to either the next record in the same block, or if the transferred record was the last record in a block, to the first record in the next block. Head and cylinder boundaries are automatically crossed unless this would result in going beyond the current extent. If no other blocks remain in the current extent, the current-position becomes end-extent. If the next block is an end-of-data mark (zero length DL), then the current-position becomes end-file. If the current define extent specified a block size in bytes 2 and 3, then that is used as the current block size. Otherwise, if any current locate record specified a transfer length factor in bytes 14 and 15, then that is used as the current block size. If neither were specified, the maximum block size specified in the define-structure-token is used as the current block size. If the DL of the block is greater than the current block size, then unit check with unique sense is returned. For files with a record format of FB, if the DL is not an integral multiple of the maximum record length associated with the current-token, then unit check with unique sense is returned. For files with a record format of V, the block descriptor word (BDW) at offset 0 in the data block is verified to be less than or equal to the DL of the block, but is not transferred to central storage. If the operation code indicates multi-track operation (the high bit is 1), then the operation is repeated until the CCW byte count is exhausted, unless an exception condition occurred on the previous record. If the operation code does not indicate multi-track operation, then only a single record is processed, regardless of the CCW byte count. The control unit will continue to provide the key values and the associated addresses to the main computer until the total byte count reaches a preset length, presumably the size of the available memory. Transformed, or compressed, keys can be provided by the control unit, using standard compression algorithms. The transformed keys will necessarily take up less of the memory; thereby, providing the computer with the ability to sort a larger number of skeletons.

Once the skeleton data, i.e. the key values and the device addresses, have been read into memory, the sorting stage, 14, can commence. Standard sorting algorithms can be used to sort the skeleton data. Rather than sorting records, the skeleton sort will sort an array of key values which are accompanied by their associated device addresses. If all of the data consisting of key and address pairs fits into memory, then the sorting task will be completed in a single operation, and the third step of merging may be by-passed. If, however, there is more data than the memory can hold, the sorted contents of memory, a string or run, will be generated, at 15, and stored in temporary storage, such as work file, 22. The skeleton locate, skeleton read, and sorting processes will be repeated until all of the input data has been read, sorted into strings or runs, and stored in work files.

The merge step, 16, will proceed as in the prior art. Strings of sorted data will be accessed from temporary storage and merged into a completely sorted string. The merging process may require several iterations to combine all of the strings, should the number of records on which the skeletons are being sorted be vast. Once the merge operation is complete, the final step, 17, that of writing the output file, will be conducted.

The write process can be conducted in one of two ways when outputting skeleton-sorted data. If the output data does not reside in the skeleton domain, a traditional write will be used to write the output file, Method A as referred to in FIG. 2 and as illustrated by lines 33 and 34 in FIGS. 1A and 3. The main computer will read the records from the device into memory in the sorted order using standard read commands. This is illustrated by the dotted line 33 in FIG. 1A. The final stage will be writing the reread records, dotted line 34, to a final output data file, 24, using normal write commands. As noted above, it is not the optimal situation to have the output on other than a skeleton domain, since the main computer must then remain involved in the process throughout.

Figure 1B:
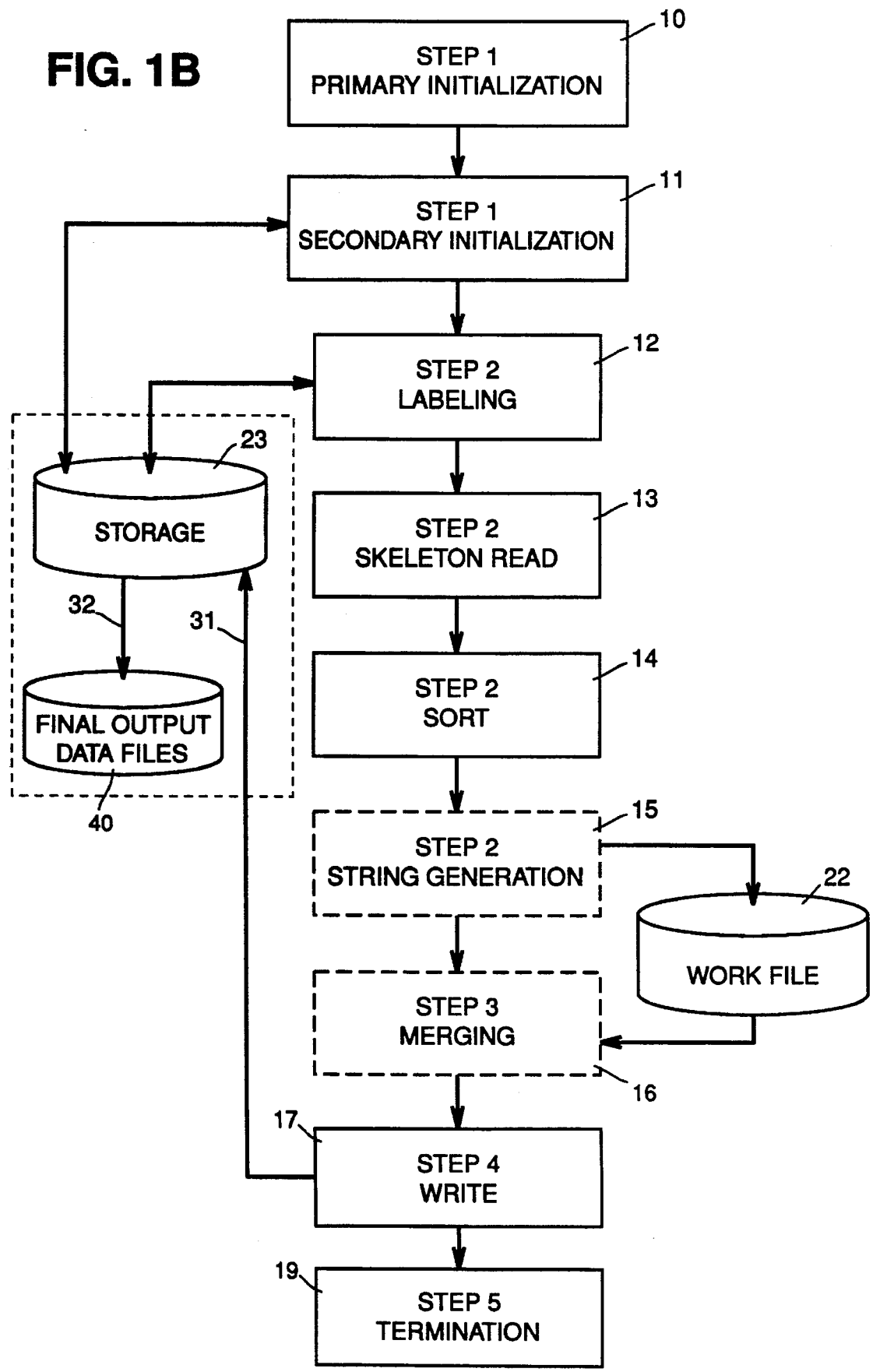

When the output does reside in the skeleton domain, 40 in FIG. 1B, the skeleton write commands can be implemented, Method B in FIG. 2, illustrated with lines 31 and 32 in FIGS. 1B and 3. This will free up the main computer earlier in the process. Essentially, the main computer will issue a skeleton write command, at which point the control unit will proceed to write the records in the sorted order directly to a final output data file, 24, with no further involvement of the main computer. In practice, the skeleton write operation requires that the main computer have access to the input data. To establish this link, an access token must be created. If the output data is to have the same record format as the original input data, then the structure token from the input may be used. If the output data format is different, then a new structure token must be created, in the manner described in step 2. This operation transfers a password and a related structure-token to the control unit. In addition to becoming the password for the created access-token, the password must also be valid for the specified structure-token. The control unit saves this information, the current device-id within the control unit, and the current filemask and extent range from the prior define-extent CCW, and assigns a unique token for subsequent reference. This token now becomes the current-token and may be transferred to central storage by a chained get-current-token operation for use in subsequent operations. A create access token control command, 36 of FIG. 3, will be issued to the control unit along with the password (from the structure token) and the structure token. The main computer will then fetch the access token with a get current token read command, 37 of FIG. 3. Subsequent skeleton write commands accompanied by the proper access token will be allowed to read directly from the original data. Once the access token has been fetched, the writing of the output data can be initiated. The skeleton write command, illustrated as line 31, will include the password, the destination address, access token and location of the record, and destination block information. The destination block information tells the control unit to assemble the records into a contiguous block and the exact location of the record within the output block. With all of the information provided by the main computer in the skeleton write command, the control unit is able to assemble the records in blocks and write the blocks directly, line 32, to a final output data file, 40, without main computer involvement. In IBM 3990, operation, the skeleton write control command must be within the scope of a format-write locate-record domain. It transfers a password, a destination-count-area (CCHHRKDD), and a list of source-record/destination-record-offset pairs to the control unit. All access-tokens must have been defined with the password specified and the same related structure-token. This list identifies to the control unit the location and format of the records to be used to construct a block, and the block offsets of the resulting records. All records in the destination-record-id list will be contained within the block identified by the destination-count-area. The K (key length) field of the count area must be x'00'. Each source-record-id contains an access-token referring to a device and extent, and a record location in the form CCHHROO (cylinder, head, block and byte offset); each destination-record-offset has the format OO (byte offset of the record in the destination block). The source skeleton records fields associated with the position and length pairs of the source token are formatted as specified in the position/length pairs related to their respective tokens, and assembled into a single block for the destination dataset. Before the destination blocks are produced by assembling the specified source records, the destination is cleared to zero, so that any unspecified destination record areas are zero. For record format V, the BDW (first four bytes of the data block) are set equal to the DD of the destination count field, followed by two bytes of zero. All position/length pairs lists must include the RDW as the first word. The first halfword of this word will be reset after record formatting to the length of the destination record.

A final step, illustrated as Step 5 at 19 in FIGS. 1A and 1B and at 19 in FIG. 3, is a termination or cleanup step in which all tokens are deleted and files closed. In implementation, the current-token becomes undefined and the operating system call is effected to close all open input and output files.

The foregoing description has been written to the sort process itself rather then a specific hardware implementation of skeleton sort, in order to secure an understanding of the broad concepts of the process. The implementation will become apparent to those having skill in the computer arts. Although the invention has been described with reference to a preferred process flow, etc., it is to be understood that the descriptions are intended to cover modifications and equivalents which may become apparent to one having skill in the art. Such alternatives, modifications and equivalents cannot be implemented without departing from the spirit and scope of the appended claims.

What is claimed is:

1. A method of sorting records on at least one user-designated sort key, said records residing on a storage facility having an intelligent control unit adapted to extract selected data from records stored therein and separate from a main computer having memory comprising the steps of:
   a) creating a plurality of skeletons, one for each record, comprising extracting selected data from each record in accordance with said at least one user-designated sort key, said skeletons comprising at least said selected data and storage locations of the records, by said intelligent control unit at said storage facility;
   b) providing said plurality of skeletons from said storage facility to said main computer; and
   c) sorting said selected data of said skeletons into sorted order at said main computer.

2. The method of claim 1 further comprising the steps of:
   a) reading said records into main computer memory in said sorted order; and
   b) writing said records to output files in said sorted order.

3. The method of claim 1, wherein at least one auxiliary storage location is associated with said main computer and wherein said plurality of skeletons exceeds the memory of said main computer and wherein said providing step comprises providing skeletons for less than all of the records, and said sorting step comprises sorting said selected data of said skeletons on said at least one user-designated sort key into strings, further comprising the steps of:
   a) storing said strings in said at least one auxiliary storage location; and
   b) merging said strings into a final sorted string in a final sorted order.

4. The method of claim 3, wherein records are to be written in sorted order to output files in at least one user-designated output location, further comprising the steps of:
   a) reading less than all of the entire records into main computer memory in said final sorted order;
   b) writing said records to said at least one user-designated output file in said final sorted order; and
   c) repeating said reading and writing steps for all records.

5. A sort process for a main computer to sort, on at least one user-designated sort key, selected data from a plurality of records stored on an associated device and to write said plurality of records to an output file in at least one user-designation output location, said associated device comprising an intelligent control unit adapted to extract data from records stored therein, comprising the steps of:
   a) identifying data in said plurality of records by said intelligent control unit of said associated device based on said at least one user-designated sort key;
   b) providing the position and length of said identified data for each of said records from said associated device to said main computer;
   c) reading said identified data for each record into the memory of said main computer;
   d) sorting said identified data into a sorted order on said at least one user-designated sort key at said main computer;
   e) providing said sorted order from said main computer to said associated device; and
   f) writing said records directly from said associated device to said output file in said sorted order.

6. A sort process for a main computer to sort, on at least one user-designated sort key, records stored on an associated device, said associated device comprising an intelligent control unit adapted to extract data from said records, comprising:

a) creating a plurality of skeletons including selected data extracted from said records in accordance with said at least one user-designated sort key at said intelligent control unit of said associated device;

b) providing said skeletons of less than all of said records from said associated device to said main computer;

c) sorting said selected data of skeletons on said at least one user-designated sort key, thereby creating at least one string at said main computer;

d) storing said at least one string;

e) repeating steps b) through d) for all records; and f) merging said at least one strings into a final string in a final sorted order.

7. The sort process of claim 6 further comprising:

a) providing said associated device with said final sorted string; and b) writing said records in said final sorted order.

8. The sort process of claim 6, wherein said main computer has an associated final output data file, further comprising:

a) reading less than all of the entire records into the memory of said main computer;

b) writing said read entire records to said final output data file; and c) repeating steps a) and b) for all records.

9. A method of sorting records, each of which has a key value, said records residing on a storage facility having an intelligent control unit adapted to extract selected data from records stored therein and separate from a main computer having memory, wherein said records are to be written to an output file in at least one user-designated output location, comprising the steps of:

a) extracting a plurality of key values and storage locations of the records by said intelligent control unit at said storage facility;

b) providing said plurality of key values and storage locations of the records from said storage facility to said main computer;

c) sorting said key values into a sorted order at said main computer;

d) providing said sorted order from said main computer to said storage facility; and e) writing said records directly from said storage facility to said output file in said at least one user-designated output location in said sorted order.

10. A method of sorting records, each of which has a key value, said records residing on a storage facility having an intelligent control unit adapted to extract selected data from records stored therein and separate from a main computer having memory, said main computer having associated therewith at least one auxiliary storage location, comprising the steps of:

a) extracting a plurality of key values and storage locations of the records by said intelligent control unit at said storage facility;

b) providing key values and storage locations for less than all of said records from said storage facility to said main computer;

c) sorting said key values into strings in said sorted order at said main computer;

d) storing said strings in said at least one auxiliary storage location;

e) merging said strings into a final sorted string in a final sorted order;

f) providing said final sorted order from said main computer to said storage facility; and 11. A system for a main computer to sort records on a user-designated sort key, said records not being stored at said main computer comprising:

a storage device associated with said main computer, said storage device comprising a record storage location and an intelligent control unit adapted to skeletonize each of said records including at least extracting data from said records in accordance with said user-designated sort key and providing said extracted data and record location data to said main computer for sorting.

12. The method of claim 1, wherein said records are to be written to at least one output file in at least one user-designated output location, further comprising the steps of:

a) providing said sorted order from said main computer to said storage facility; and b) writing said records directly from said storage facility to said at least one output file in said sorted order.

13. The method of claim 3 further comprising the steps of:

a) providing said final sorted order from said main computer to said storage facility; and b) writing said records from said storage facility to output files in at least one user-designated output location in said final sorted order.

* * * * *